(12) United States Patent
Wolf et al.

(10) Patent No.: US 7,184,450 B1
(45) Date of Patent: Feb. 27, 2007

(54) SYSTEM AND METHOD FOR DECODING AUDIO/VIDEO DATA SUCH AS DVD OR/AND DVB DATA

(75) Inventors: Christopher K. Wolf, San Jose, CA (US); Ygal Arbel, Belmont, CA (US); Himanshu A. Sanghavi, Fremont, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/301,438

(22) Filed: Apr. 28, 1999

(51) Int. Cl.
*H04J 3/04* (2006.01)
*H04L 12/28* (2006.01)
*H04N 5/91* (2006.01)
*H04N 5/262* (2006.01)

(52) U.S. Cl. .................... 370/535; 370/412; 386/98; 348/423.1

(58) Field of Classification Search ............... 370/535, 370/522, 536, 509, 503–508, 395.64; 386/95–98, 386/18, 20, 33, 90, 91, 111, 112, 125, 126, 386/295; 348/423.11, 473; 375/240.28, 375/240.26, 98, 423.01
See application file for complete search history.

(56) References Cited

U.S. PATENT DOCUMENTS 5,396,497 A * 3/1995 Veltman .................... 370/506
5,537,148 A * 7/1996 Fujinami .................... 348/473
5,559,999 A * 9/1996 Maturi et al. ............... 370/522
5,668,601 A * 9/1997 Okada et al. ............ 375/240.25
5,703,877 A * 12/1997 Nuber et al. ............. 370/395.64
6,047,027 A * 4/2000 Miyagosi et al. ....... 375/240.28
6,148,135 A * 11/2000 Suzuki ........................ 386/98
6,151,441 A * 11/2000 Kawamura et al. ........... 386/95
6,157,674 A * 12/2000 Oda et al. ................... 370/509
6,163,647 A * 12/2000 Terashima et al. ............ 386/96
6,363,207 B1 * 3/2002 Duruoz et al. ............... 386/98

* cited by examiner

*Primary Examiner*—Steven Nguyen
(74) *Attorney, Agent, or Firm*—Ronald J. Meetin

(57) ABSTRACT

A system (20) for decoding a data stream allocated into data packets contains a control unit (54), a stream demultiplexer (26), audio and video decoders (38 and 40), a memory management unit (60), and audio and video input and output buffers. Upon demultiplexing and depacketizing the data packets without interrupting the control unit, the demultiplexer sends encoded audio and video data to the audio and video input buffers. Video messages dealing with video timing information and identifying where encoded video data is stored in the video input buffer are furnished by the demultiplexer for use by the control unit. Utilizing corresponding video instructions provided from the control unit, the video decoder decodes encoded video data to produce decoded video data supplied to the video output buffer. The audio decoder decodes encoded audio data to produce decoded audio data supplied to the audio output buffer. The memory management unit controls transfer of decoded audio data to and from the audio output buffer.

45 Claims, 7 Drawing Sheets

Format of Task Definition Packet

| Word offset | Data [31:0] |
|---|---|
| 0 | Address of picture to be decoded |
| 1 | Picture size bits |
| 2 | Picture control and Fcode Register bits |
| 3-34 | Quantizer Matrix Coefficients |
| 35-39 | Reserved |

FIG. 3

AUDIO SYNC WORD MESSAGE FORMAT

| bits [31:20] | bits [19:10] | bits [9:0] |
|---|---|---|
| | SAMPRATE | NCHANS |
| | INBUF_LEVEL | LAYER |
| | FRM_SIZE | BITRATE |
| | OUTBUF_WR_PTR | |
| | INBUF_RD_PTR | |
| | FRM_NUMBER | |
| | STATUS | |
| MSG_TYPE = 3 | | MSG_ID = 0x100 - 0x1FF |

FIG. 4

| | | | | |
|---|---|---|---|---|
| N | 31:6 | 25 | | Reserved |
| | 6:5 | 2 | DTS | Valid DTS present<br>00 = no DTS<br>01 = DTS carried in PES<br>10 = DTS carried in DTS_next_AU field of transport packet<br>11 = reserved |
| | 4:3 | 2 | ERROR | Error Type<br>00, 01 = no error<br>10 = Transport Propagated Error<br>11 = Transport Continuity Error |
| | 2:0 | 3 | EVENT | Event Type<br>000 = Video Start Code<br>001 = Packet<br>010 = Substream Section<br>011 = Table Section<br>100-110 = reserved<br>111 = mid-stream error |
| N+1 | 31:27 | 5 | BUFFER | The number of the buffer containing the event |
| | 26:22 | 5 | OFFSET | Offset from address of the event, modulo buffer length |
| | 21:0 | 22 | ADDRESS | The byte address of the event in the buffer, minus offset modulo buffer length |
| N+2 | 31:0 | 32 | DATA_LO | Event Data Low.<br>IF EVENT is<br>000 - 10: If DTS is<br>  0 : bits [31:0] = reserved<br>  1 : bits [31:0] = DTS[32:1]<br>011 : bits [31:0] = table header bytes 1, 2, 3, 4<br>100 - 111 : reserved |
| N+3 | 31:0 | 32 | DATA_HI | Event Data High.<br>IF EVENT is<br>000 - 01 : bits [30:0] = reserved. If DTS is<br>  0 : bits [31] = reserved<br>  1 : bits [31] = DTS[0] |
| | | | | 010 : bits [23:0] = sub-stream header bytes 2, 3, 4 if Substream ID TYPE = 01 or 10.<br>bits [7:1] = reserved<br>If DTS is<br>  0 : bit [31] = reserved<br>  1 : bit [31] = DTS[0]<br>011 : bits [31:0] = table header bytes 5, 6, 7, 8<br>100 - 111 : reserved |

FIG. 7

SYSTEM AND METHOD FOR DECODING AUDIO/VIDEO DATA SUCH AS DVD OR/AND DVB DATA

FIELD OF THE INVENTION

The present invention relates to a decoder system and, more particularly, to a decoder system for decoding Digital Versatile Disc (DVD) or Digital Video Broadcast (DVB) data streams.

BACKGROUND

Digital Versatile Disc (DVD) and Digital Video Broadcast (DVB) data decoders are well known. A conventional DVD/DVB decoder system includes a central processing unit, a stream demultiplexer, an audio decoder, a video decoder, a memory controller, an MPEG system timer, a video output processor and an audio output processor.

Conventional DVD/DVB decoder systems have many disadvantages. First, they typically include two separate depacketizers; an audio depacketizer coupled to the audio decoder for depacketizing audio data, and a video depacketizer coupled to the video decoder for depacketizing video data, leading to duplication of many tasks. Therefore, such systems are not cost effective.

Second, the Central Processing Unit (CPU) of conventional DVD/DVB systems is frequently interrupted, requiring the CPU to temporarily abandon its existing tasks to service the interrupts, leading to inefficient utilization of the CPU. Furthermore, because the interrupts are frequent and not synchronized to a common event, such systems must meet strict and inflexible timing requirements. Moreover, in such systems, because the CPU typically demultiplexes the stream data in addition to handling many other tasks, it must be very powerful and hence relatively expensive.

Third, the Packetized Elementary Stream (PES) data supplied to the audio and the video decoders of conventional DVD/DVB systems typically includes a time stamp which must be stripped off before the data is decoded, resulting in processing inefficiencies.

SUMMARY

The Digital Versatile Disc (DVD) and Digital Video Broadcast (DVB) decoder, in accordance with one embodiment of the present invention, includes a stream demultiplexer, a data storage buffer and a control Central Processing Unit (CPU). The stream demultiplexer demultiplexes and depacketizes the raw DVD data stream, subsequently stores the video and audio data in the storage buffer and informs the CPU thereabout.

The stream demultiplexer extracts the timing information embedded in each data pack of a data stream and, accordingly, generates messages about the stored data and their locations in the storage buffer. These messages include tags containing the decode time stamp, the presentation time stamp and the storage location of each data pack stored in the buffer.

The CPU reads the information recorded in each tag and, accordingly, generates task definition packets for use by the decoder.

The decoder is fully synchronized with respect to a signal generated by a video output processor of the system. Accordingly, in a steady state and under normal operating conditions, the CPU is interrupted only when the synchronization signal arrives thereby significantly reducing the number of interrupts that the CPU must service. Furthermore, the CPU benefits from having an entire period of the synchronization signal to service the interrupts and therefore has relaxed timing requirements.

The decoder is pipelined to reduce the idle time and hence to increase the utilization of the CPU and the video decoder. Accordingly, during each cycle of the synchronization signal, while the video decoder decodes the data, the CPU generates a task definition packet for the data to be decoded during the next cycle.

Because the stream demultiplexer removes all the timing information from the data before storing it in the storage buffer, the tasks performed by the audio and video decoders are simplified. Furthermore, because the CPU is the component that makes all the decisions about the particular data and its decode time, the audio and video decoders have vastly simplified tasks.

The stream demultiplexer also depacketizes the audio data stream. The stream demultiplexer extracts the timing information from each audio data pack and stores its payload in the buffer. Thereafter, the audio decoder determines the offset between the beginning of an audio data packet and the beginning of an audio frame and supplies the information to the CPU. The CPU using the time stamp information provided by the stream demultiplexer and the offset information provided by the audio decoder determines the presentation time of an audio frame.

Other aspects and advantages of the present invention are apparent from the following detailed description and accompanying drawings.

BRIEF DESCRIPTION OF THE DRAWINGS

FIG. 3 shows the basic components of a task definition packet in accordance with one embodiment of the present invention.

FIG. 4 shows the format of a message generated by the audio decoder to the CPU when a sync word in the audio stream is found.

FIG. 7 shows an event tag format in accordance with one embodiment of the present invention.

DETAILED DESCRIPTION

Figure 1:
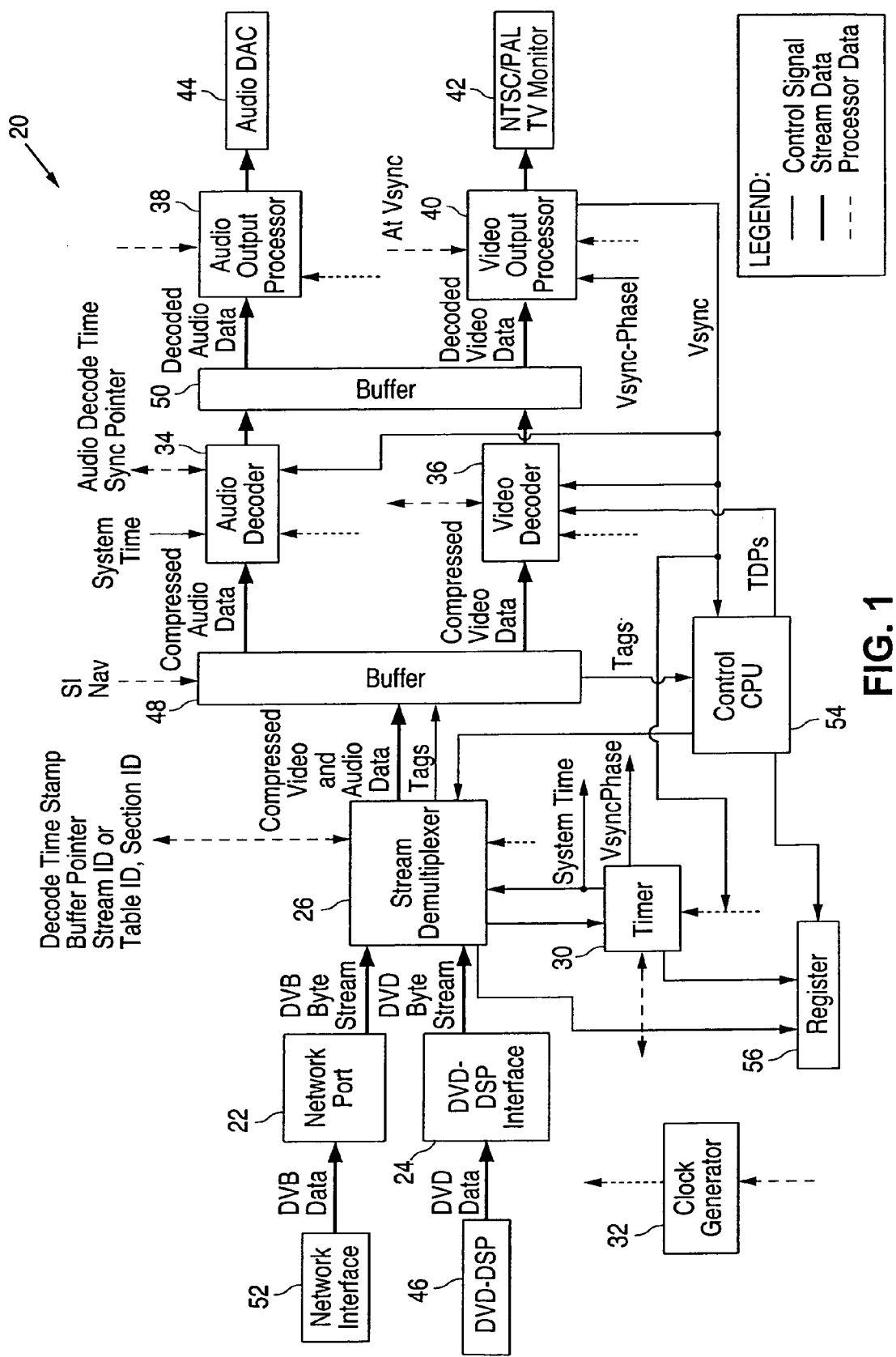
FIG. 1 shows a block diagram of a decoder in accordance with one embodiment of the present invention.

A schematic block diagram of a Digital Versatile Disc (DVD)/Digital Video Broadcast (DVB) decoder 20, in accordance with one embodiment of the present invention, is illustrated in FIG. 1.

Decoder 20 uses three data paths in either the DVD or DVB mode of operation, namely a video data path, an audio data path, and a control path.

Decoder 20 includes, in addition to other components not shown, a Network Port (NP) 22, a DVD-DSP interface 24, a Stream Demultiplexer (SD) 26, a timer 30, a clock generator 32, an audio decoder 34, a video decoder 36, an Audio Output Processor (AOP) 38, a Video Output Processor (VOP) 40, a control Central Processing Unit (CPU) 54 and a register 56.

In decoder 20, only a subset of the above components process the audio data. For example, audio decoder 38 only decodes encoded audio data. Similarly, the processing of video data is performed by a subset of the decoder 20 components. The processing of video data when decoder 20 is in the DVD mode of operation is described first.

The video data path of decoder 20 decodes and displays MPEG (MPEG1 or MPEG2) (developed by the Moving Pictures Expert Group of the International Standards Organization (ISO)) compressed video data synchronously with timer 30.

As shown in FIG. 1, the video data path includes DVD-DSP interface 24, SD 26, timer 30, video decoder 36, VOP 40, CPU 54 and register 56. In particular, DVD-DSP interface 24 retrieves raw DVD data bit streams and reformats it into bytes before supplying it to SD 26. SD 26 demultiplexes and depacketizes the video data stream and transports compressed video data to the compressed video buffer in buffer 48. Video decoder 36 fetches the compressed video data, decodes the data and stores the decoded data in one of the frame stores in buffer 50. VOP 40 retrieves the video frame data from buffer 50, merges the video frame data with OSD (on-screen display) and/or sub-picture data, and encodes the video frame data as an NTSC or PAL output for NTSC/PAL TV monitor 42.

In particular, depending on the data consumption rate, DVD-DSP Interface 24 retrieves raw data residing on DVD-DSP 46 at a typical rate of approximately 11 megabits per second (Mb/s). The DVD data stream supplied to SD 26 contains compressed audio, video, control and synchronization information. SD 26 demultiplexes and depacketizes the data stream, storing the demultiplexed compressed audio and video data in data buffer 48. SD 26 has access to 32 different addressable locations in buffer 48. A host programmable memory, called the routing table (not shown in FIG. 1), directs SD 26 to a particular location within buffer 48 in which the elementary streams and substreams of data are stored.

Figure 2A:
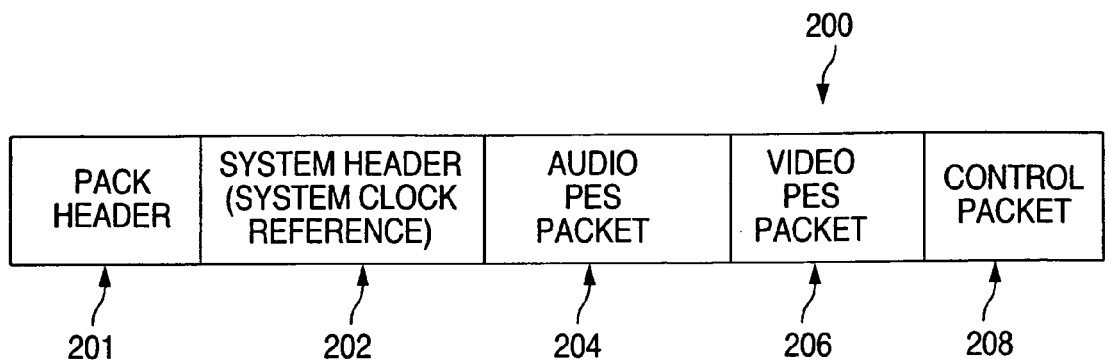
FIG. 2A shows the various components of a DVD data pack.
Figure 2B:
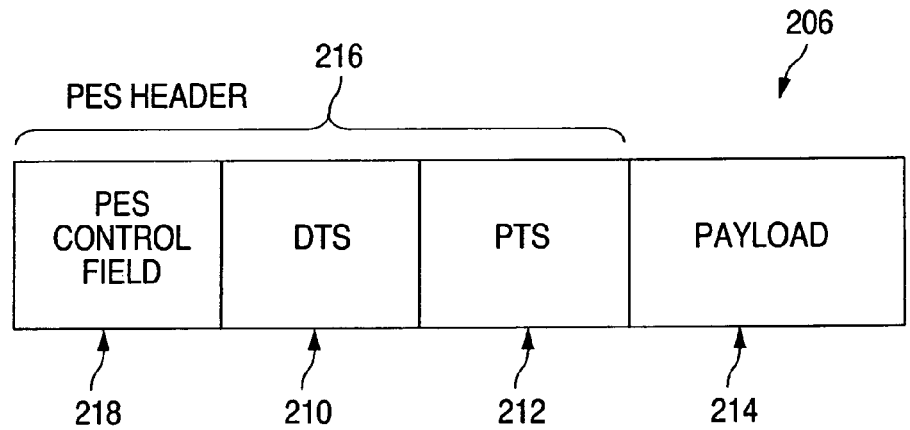
FIG. 2B shows the various components of a packet of data pack of FIG. 2A.

The DVD data is composed of data units, commonly referred to as data packs. As illustrated in FIG. 2A, each DVD data pack 200 contains a pack header 201 and may contain one or more of the following elements: a system header 202, an audio Packetized Elementary Stream (PES) 204, a video PES packet 206 and a control packet 208. As shown in FIG. 2B, each video PES packet 206 further contains a header 216 and a payload 214. Each header 216 contains a PES control field 218 and may contain a Decode Time Stamp (DTS) 210 or/and a Presentation Time Stamp (PTS) 212.

System header 202 identifies all the elementary streams of a pack. SD 26 places the entire system header 202 in buffer 48 for access by CPU 54.

SD 26 first demultiplexes the audio, video and control components of the received DVD data. Thereafter, SD 26 depacketizes the demultiplexed data, namely, SD 26 removes PES control field 218, DTS 210 and PTS 212 from each packet 206 before storing the payload 214 in buffer 48.

Therefore, video decoder 36 receives only the payload 214 of data packet 206, which is an advantage of decoder 20. Because SD 26 demultiplexes the DVD data byte streams, several advantages are realized. First, CPU 54 is allowed to specialize in more complex and decision-based tasks. Second, unlike the control CPUs of conventional DVD decoders, CPU 54 is not required to have a high processing capability and is thus relatively inexpensive.

Figure 2C:
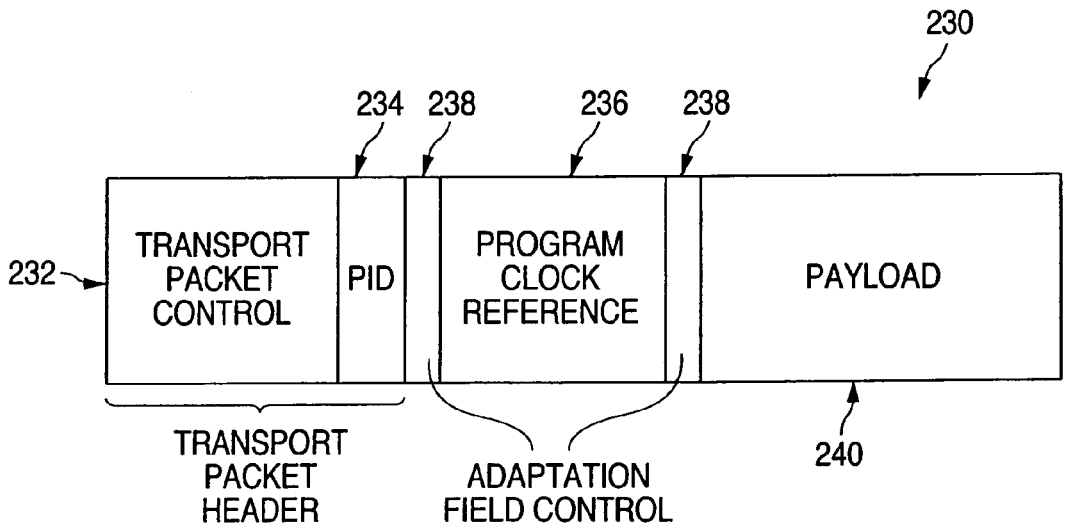
FIG. 2C shows the various components of a DVB transport data packet.

FIG. 2C shows the various components of a DVB transport data packet 230. Each DVB data packet 230 contains transport packet control 232, program identifier (PID) 234, adaptation field control 238, program clock reference (PCR) 236 and payload 240. Transport packet control 232 and PID 234 together form a transport packet header for the DVB data packet 230.

Concurrent references are made below to FIGS. 1–3 below. Each data pack 200 contains timing data embedded in its pack header 201, which establishes a timing reference with respect to which the PTS 212 of the associated PES packet 206 is measured. In other words, the display time of a payload 214 is determined by comparing its PTS 212 to the reference timing data embedded in the associated system header 202.

Timer 30 is a real time clock that establishes the time base for all the timing references in system header 202. Therefore, timer 30 detects whether the recorded times in system header 202 have arrived. Timer 30 also includes facilities which trigger events when a particular time is reached. Consequently, timer 30 generates events based on specific times or records the times when specific events occur.

As is seen from FIG. 1, Video Output Processor (VOP) 40 receives a signal VsyncPhase from timer 30. VOP 40 generates a synchronization signal, called Vsync, every 16 milliseconds (i.e., 60 Hz for NTSC systems) which is the typical rate at which a Cathode Ray Tube (CRT) or a TV monitor is refreshed. Signal Vsync is supplied to Central Processing Unit (CPU) 54, video decoder 36 and timer 30. Signal Vsync synchronizes the activities of the various components of decoder 20 and, accordingly, controls the DVD data consumption rate, as is described below.

Whenever SD 26 extracts the pack header 201 of a data pack 200, it instructs timer 30 to store the current time in register 56. SD 26 stores the clock reference from the pack header in register 56. Therefore, register 56 stores both the clock reference of the data pack 200 as well as the time at which the pack arrives at SD 26. CPU 54 has access to register 56 and can read its content to determine the difference between the two timing data. In a steady state, when the system is fully synchronized, a fixed timing difference exists between the clock reference of data pack 200 and the time when data pack 200 arrives at SD 26.

Furthermore, after demultiplexing and depacketizing a DVD data pack 200, SD 26 extracts the associated time stamps (i.e., DTS 210 and PTS 212) of the data packet 206, stores video payload data 214 in buffer 48 and generates a video message, or tag, which contains the DTS and the address of the stored data in buffer 48. In other words, for each data pack 200, SD 26 generates a tag containing information about both the decode time stamp as well as the address of the stored data in buffer 48. The generation of the tags is a significant advantage of decoder 20.

The video messages, or tags, thus generated are made available to CPU 54 for further synchronization and control of decoder 20. Using the information stored in a tag, CPU 54 generates a Task Definition Packet (TDP) containing instructions to video decoder 36 about the location of the data in buffer 48. Upon the arrival of the next Vsync signal, video decoder 36 decodes the data identified by the TDP. If no TDP has been generated by CPU 54, video decoder 36 does not decode any data at the occurrence of the Vsync signal.

FIG. 3 shows the basic format of a TDP. Each TDP is composed of 40 words (each word consists of 32 bits) of which the last 5 words are reserved. The first word of each TDP contains the address (with respect to buffer 48) of the next video picture to be decoded.

Depending on the data consumption rate, CPU 54 may instruct video decoder 36 to decode data out of sequence. Therefore, if a faster data consumption rate is necessary, CPU 54 skips over the next frame of data in buffer 48 and thus issues a TDP pointing to the address of the succeeding data frame in buffer 48. If a slower data consumption rate is necessary, CPU 54 does not issue a TDP and thus the previously decoded data frame is displayed.

Since the decision regarding when and which data to decode next is made by CPU 54 and not by video decoder 36, DVD/DVB decoder 20 provides several improvements over those of the prior art. First, video decoder 36 benefits from a relatively simple design because it needs to decode data only when so instructed. Second, because CPU 54 is controlled through software, CPU 54 lends itself to a highly low-level control, thereby adding to the overall flexibility of the system while making the system easily upgradeable. Third, the generation of the tags relieves CPU 54 from the computationally intensive and hence costly task of reading the data that flows between various components of decoder 20. The tags enable the CPU to receive the information it needs to determine which data must be decoded, thereby greatly easing the computational burden on the CPU.

The tags generated by SD 26 are read by CPU 54 only when a Vsync signal arrives. Therefore, in a steady state and under most operating conditions, CPU 54 is interrupted only when a tag is present at the occurrence of a subsequent Vsync signal; this is an advantage of the DVD/DVB decoder 20 which generates fewer interrupts than do other known systems. Moreover, because in the steady state, the interrupt requests are only generated during Vsync occurrences, CPU 54 advantageously has an entire Vsync time period (i.e., the time interval between two successive Vsync signals) to service those interrupts. In particular, when a Vsync signal arrives, CPU 54 reads buffer 48 to determine whether SD 26 has generated any tags. If one or more tags exist, CPU 54 performs its assigned tasks and generates corresponding TDPs. However, CPU 54 has the entire period from the reading of the tags until the arrival of the next Vsync signal to complete all of its tasks including the generation of the TDPs. Hence, CPU 54 may continue to finish its ongoing tasks uninterrupted, provided, however, that CPU 54 services the requested interrupt prior to the arrival of the next Vsync signal. Therefore, decoder 20 benefits from very relaxed timing requirements. The relaxed timing requirements resulting from the availability of an entire Vsync period to CPU 54 to read the tags and to generate corresponding TDPs is a significant advantage of DVD decoder 20 over the known DVD decoders which because they require their CPU control units to immediately—but temporarily—abandon their ongoing tasks to service the interrupts in a very short time period, impose tight and rigid system timing requirements.

As stated above, although in a steady state and during normal operating conditions, the occurrence of the Vsync signal is the main synchronizing mechanism for generating interrupt requests to CPU 54, other mechanisms such as polling may also be used to prompt the CPU to read the tags and generate TDPs.

The data decoded by video decoder 36 is stored in buffer 50 for subsequent processing by VOP 40. Because CPU 54 decides when and which data is to be decoded next, it also knows whether any decoded data has been placed in buffer 50. Consequently, when such data exists, at the occurrence of the next Vsync signal, CPU 54 instructs VOP 40 to fetch the data from buffer 50 for further processing. After a known time period, the data fetched and processed by VOP 40 is displayed on monitor 42.

The generation and processing of the TDPs by CPU 54 and video decoder 36 are pipelined. In particular, in a steady state, CPU 54 generates TDPs that will be processed by video decoder 36 during the next Vsync signal cycle. Therefore, CPU 54 is always generating TDPs one Vsync signal cycle ahead. The pipelining provides CPU 54 and video decoder 36 with an entire Vsync signal cycle to respectively process the TDPs and decode the data, while simultaneously reducing the idle time of the decoder and thereby increasing the utilization and throughput of the decoder.

The processing of audio data when decoder 20 is in the DVD or DVB mode is described next. Referring to FIG. 1, DVD-DSP interface 24 retrieves DVD data from DVD-DSP 46, subsequently reformats this data as a stream of bytes, and supplies the stream of bytes to SD 26. Similarly, Network Port 22 retrieves DVB data from Network Interface 52, reformats this data as a stream of bytes, and supplies the stream of bytes to SD 26. SD 26 extracts the audio data stream from the incoming data, depacketizes the data, and stores the data in buffer 48. Audio decoder 34 decodes the stored audio data and writes the decoded data to data buffer 50. Thereafter, AOP 38 fetches the data from buffer 50, processes the data and supplies it to audio Digital-to-Analog Converter (DAC) 44. Accordingly, in this embodiment, the audio path includes DVD-DSP interface 24, SD 26, timer 30, audio decoder 34, AOP 38 and CPU 54.

In MPEG, an audio time stamp is located at the beginning of a PES packet, but it actually refers to the first byte of the first audio sync frame that begins in the packet, and thus, there is no alignment between audio sync frames and PES packet boundaries. The audio bit streams contain start code patterns (sync words), but they are not individually uniquely identifiable from the actual audio data, thereby making it difficult to detect the start of an audio data frame.

In MPEG, a new audio frame is identified by identifying an audio marker that constitutes a repeating 12-bit field. Thus, for example, if the 12-bit pattern of an audio marker is identified three times, then it may be safely assumed, with a high degree of certainty, that the frame is an audio data frame.

After depacketizing an audio frame, SD 26 stores the PES payload in buffer 48 and generates an audio message, or tag, informing CPU 54 of the location of the stored audio frame in buffer 48. Consequently, SD 26 has knowledge of both the location of the audio frame in buffer 48 as well as its corresponding time stamp. SD 26, however, does not know the offset between the beginning of the packet and that of the frame.

Audio decoder 34 decodes the data and upon detecting the corresponding sync word, marks the address and so informs the CPU 54. FIG. 4 shows the format of the message generated by audio decoder 34 to CPU 54 when audio decoder 34 finds a sync word in the compressed audio stream. Each such message has 32 bits. Bits [31:20] of each word are reserved, and only the lower 20 bits are used. The various parameters of the message when decoding MPEG audio are defined below:

| | |
|---|---|
| NCHANS | number of audio channels in the input bit-stream (including LFE) |
| SAMPRATE | sampling rate |
| LAYER | 1 = MPEG layer 1, 2 = MPEG layer 2 |
| INBUF_LEVEL | Level (count) of the compressed audio data input buffer |
| BITRATE | Bit rate in kilobits/sec |
| FRM_SIZE | Size of the last decoded frame |
| OUTBUF_WR_PTR | Current write pointer of the output buffer used to store decoded audio data |
| INBUF_RD_PTR | Current read pointer of the input buffer used to store compressed audio data |
| FRM_NUMBER | A running count of the frames decoded |
| STATUS | A status word used for debug and diagnostics |
| MSG_ID | Linearly incrementing number which acts as an ID for the message |
| MSG_TYPE | Has the value 3 indicating it is a Sync Found message. |

Using the marked address and the SD-generated tags, CPU 54 establishes correlation between a sync word and its associated audio frame in buffer 48. Consequently, CPU 54 uses the information provided by SD 26 and audio decoder 34 to determine when a particular frame of audio data must be presented, the details of which are described below.

Figure 5:
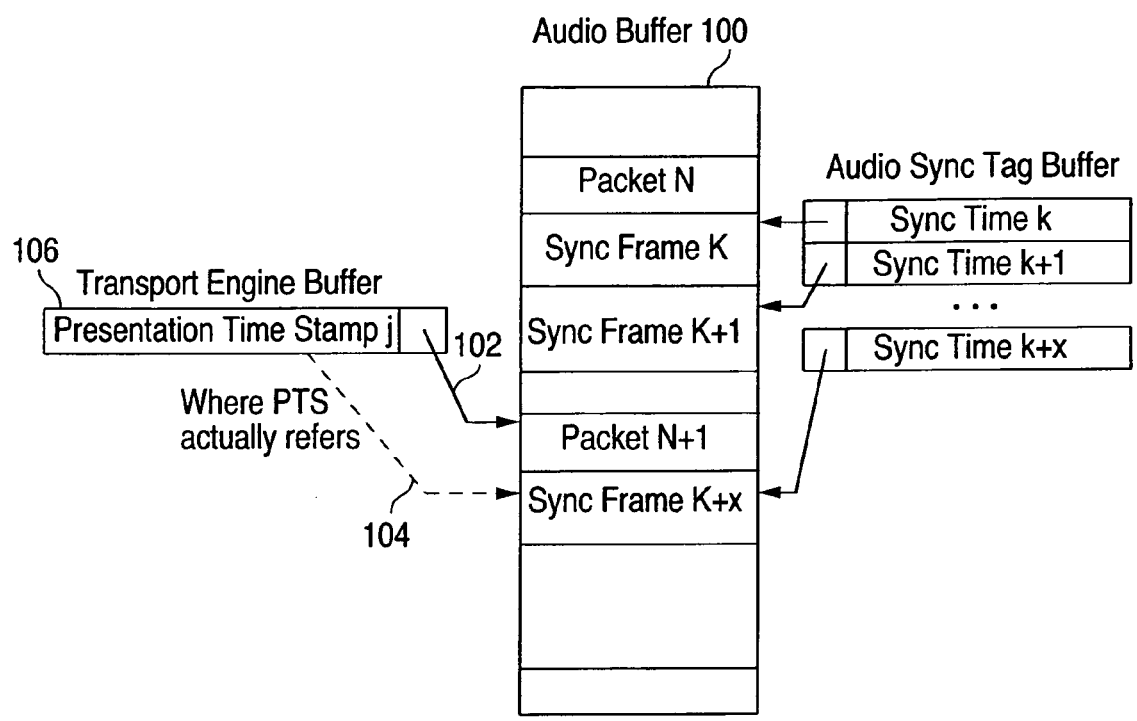
FIG. 5 shows an audio buffer in accordance with one embodiment of the present invention.

FIG. 5 shows an audio buffer 100 in accordance with one embodiment of the present invention. Audio buffer 100 is part of input buffer 48. In audio buffer 100, pointer 102 shows where the address part of an SD-generated tag 106 points. Arrow 104 indicates a sync frame for that tag 106.

The audio decoder 34 of FIG. 1 supplies the location of the audio sync word in system memory (e.g., in DRAM). When audio decoder 34 detects a sync word, it captures the current system memory address from which it is reading. Sync frames are generally of a fixed size as indicated by audio buffer 100 of FIG. 5. Thus, if CPU 54 knows the start address, it can obtain other start addresses by simply adding a multiple of the sync frame size.

Further, CPU 54 knows the nominal compressed audio data rate. Thus, once CPU 54 has a time stamp, it can add a time offset per byte consumed by AOP 38 to obtain the desired audio decode time. By comparing the desired decode time with the actual system time, CPU 54 determines whether audio decoder 34 is ahead of or behind schedule. CPU 54 can then instruct audio decoder 34 to skip or repeat data as appropriate.

Referring to FIG. 1, timer 30 may perform timer operations for the audio data processing that are similar to its timer operations for the video data processing, as described above.

In some embodiments, audio decoder 34 is controlled by CPU 54. Under CPU 54 control, audio decoder 34 may operate as a slave co-processor or as a free-running decode engine. In slave co-processor mode, audio decoder 34 decodes one or more audio frames in response to a CPU 54 decode command. A new command is required for every frame (or a number of frames) to be decoded. Upon completion of its tasks, audio decoder 34 notifies CPU 54 of the completion of its activities by storing a message in the message queue (See FIG. 9 discussed below) of buffer 48. In some embodiments, audio decoder 34 generates an interrupt request to CPU 54 after completing its tasks. Thereafter, audio decoder 34 remains idle until it receives another command.

In free-running mode, audio decoder 34 decodes audio frames when the amount of data in input buffer 48 reaches a predetermined threshold level. In this mode, CPU 54 may only generate commands to synchronize or adjust the data consumption rate. Thus, the audio decode rate is regulated by the levels of input buffer 48 and output buffer 50, and the audio decode operation will be suspended while the input buffer content level is too low or the output buffer level is too high relative to predetermined threshold levels.

In addition to data processing, audio decoder 34 maintains audio synchronization by providing CPU 54 with the current positions of the input and output buffer pointers at the beginning of each audio frame. Based on this information, CPU 54 correlates the encoded and actual presentation time of the audio data and provides audio synchronization adjustment commands as appropriate.

Start-up processing typically occurs on a reset, power-on, or while switching programs. CPU 54 mutes the audio output until audio presentation time stamps arrive in the data stream, and the audio synchronization software is running. CPU 54 manages the total delay in the audio decode-presentation path by manipulating the depth of the audio portions of input buffer 48 and output buffer 50. In particular, CPU 54 may control the buffer depth by controlling when audio decode tasks are issued and started. Audio decoder 34, in free-running mode, holds off from processing the next audio frame until the input buffer level reaches a predetermined threshold level (e.g., as provided by CPU 54). The audio decode-presentation path delay remains constant and matches the video decode-presentation path delay.

In steady state mode, minor synchronization adjustments may be required at various times. Due to the nature of audio decoding, there are three different granularities of delay adjustment including: adding or dropping entire audio frames, adding or dropping multiples of thirty-two samples from a frame, and delay adjustments made by changing the audio DAC clock (not shown) for controlled periods of time, a "micro-stepper" approach. Because the audio DAC clock tracks the transport stream, adjustment of the audio decode loop should be fairly infrequent.

The audio decoding operation also supports bit stream error handling. In particular, the audio decoder 34 detects the bit stream errors by means of a CRC (Circular Redundancy Check) provided in the audio stream. When an error is detected, error concealment is applied to minimize the audible effect of the error. AOP 38 reads the decoded audio data, further processes the data and subsequently supplies the data to DAC 44.

In some embodiments, AOP 38 interfaces to commercially available two-channel and six-channel audio DACs. AOP 38 retrieves data from buffer 50 and transmits the data to external audio DAC 44 at a rate dictated by the DAC clock. Based on a write request from audio decoder 34 and a read request from AOP 38, a memory management unit (discussed below with respect to FIG. 6) maintains a read pointer and a write pointer for the audio output buffer in buffer 50. By monitoring the buffer depth, rate of change, and direction of change, CPU 54 determines whether the DAC clock should be increased or decreased in frequency relative to the video (i.e., pixel) clock (not shown).

Referring to FIG. 1, decoder 20 of FIG. 1 also provides a digital video broadcast (DVB) operation. In the DVB mode (of operation), decoder 20 of FIG. 1 receives a DVB data stream from the external demodulator, selects the proper video and audio programs, extracts timing and compressed video and audio data, decodes the data, and presents the data via NTSC/PAL TV monitor 42 and audio DAC 44. Similar to the DVD operation as described above with respect to FIG. 1, decoder 20 in DVB mode extracts system information from the DVB data stream and places the system information in buffer 48 for use by CPU 54.

In particular, the DVB video path operation is similar to the DVD video path described above with the following exceptions. In the DVB video path, DVB data arrives at Network Port (NP) 22 from a network interface 52 at 40 Mb/s instead of at DVD-DSP interface 24 from DVD-DSP 46 at 11 Mb/s. Also, in the DVB video path operation, SD 26 may process a transport stream instead of a program stream. In addition, in the DVB video path operation, VOP 40 does not support sub-pictures.

In particular, NP 22 receives data from the external demodulator network interface 52 and reformats the data as a series of bytes. NP 22 then sends the data to SD 26.

In the video path of the DVB mode, SD 26 operation is generally similar to the DVD mode at the PES packet level and elementary stream level. However, at the transport packet level, SD 26 operation differs from the DVD mode of operation as described below. SD 26 looks for periodic repetitions of the sync field in transport packets and achieves byte alignment by synchronizing itself to the occurrences of packets in the transport packet layer. Also, SD 26 demultiplexes transport packets based on the PID they contain. SD 26 then depacketizes the transport packets into a stream of PES packets, extracting control and navigational information. In particular, for the video path, the splice information contained in the transport adaptation field is extracted. CPU 54 receives this extracted information, through the messaging system as described above, and uses the information to determine when to force timer 30 to reset the local time to match the input stream clock reference. In one embodiment, the navigational information appears in the form of SI table sections which SD 26 places into buffer 48 for use by CPU 54, as discussed further below with respect to FIG. 7.

In DVB mode, the audio path operation is similar to the video path operation except that audio decoder 34 and AOP 38 replace video decoder 36 and VOP 40, respectively. Also, the operation of audio decoder 34 and AOP 38 is generally similar in the DVD mode and the DVB mode.

Finally, in the DVB mode, the DVB clock control path operation is similar to the DVD clock control path operation described above with the following exceptions described below. First, data comes through NP 22 instead of DVD-DSP interface 24. Second, SD 26 processes a transport stream rather than a program stream. SD 26 extracts a clock reference from the incoming transport stream as similarly described above for the DVD operation. However, in DVB mode, there can be several clock references. Thus, SD 26 only extracts program clock references (PCR) from transport packets that have a certain PID. In particular, even though SD 26 may demultiplex and depacketize other PID packets with PCRs, only the programmed PID will be used for clock reference operations. Thus, the actual operations with clock references are similar to that described above in the DVD mode. Unlike the DVD mode in which the data stream is pulled into the system, the clock frequency in the DVB mode is adjusted to match the data rate of the incoming data stream.

In one embodiment, a DVD/DVB decoder system that includes decoder 20 of the present invention may be implemented using an ASIC (application specific integrated circuit), an on-chip processor (for CPU 54), 2 or 4 megabytes of conventional 16 megabit (MB) SDRAM arranged as 2×512K×16, expandable to 16 MB, a ROM (0.5 to 16 MB) for the operating system, application, driver, and diagnostic instruction and data storage, a stereo audio DAC or a 6 channel DAC and/or an S/PDIF output for AC-3 playback, and an 8052 microcontroller for front panel, infrared (IR) and general purpose input/output (I/O).

Figure 6:
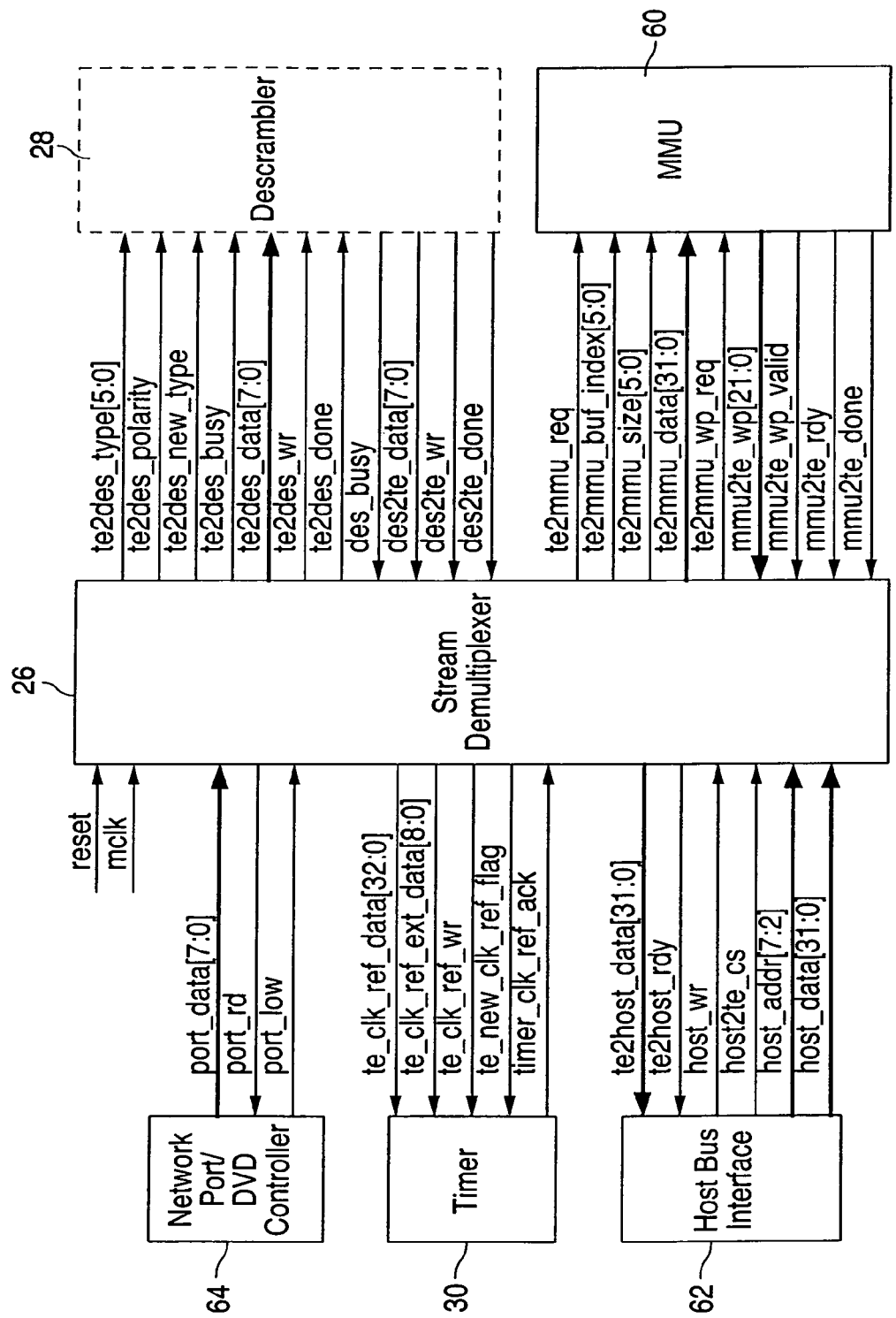
FIG. 6 shows the connections of the stream demultiplexer to various modules in the decoder of FIG. 1 in accordance with one embodiment of the present invention.

FIG. 6 shows SD 26 connections to other modules in decoder 20 of FIG. 1 in accordance with one embodiment of the present invention. In particular, SD 26 connects to timer 30, a descrambler 28, a memory management unit (MMU) 60, a host bus interface 62, and a network port/DVD controller 64.

Referring to FIG. 6, as part of depacketizing and transporting the byte stream, SD 26 writes the extracted information to MMU 60. MMU 60 subsequently transfers the information into the system memory (e.g., buffer 48 of FIG. 1). Also, the audio decoder 34 of FIG. 1 and the video decoder 36 of FIG. 1 request audio and video data, respectively, from the system memory (e.g., buffer 48 of FIG. 1) using MMU 60. In one embodiment, the system memory includes thirty-two separate buffers (e.g., buffer 48 includes thirty-two separate sub-buffers): one buffer each for MPEG video, audio, sub-picture, teletext, and various other data and control streams. Further, SD 26 tags certain events in the bit stream being written to system memory with, for example, the desired decode or presentation time, the current write location in system memory, etc. SD 26 presents the tags to CPU 54 through the message queue (e.g., an event FIFO) stored in buffer 48 of FIG. 1.

For example, when SD 26 detects clock reference (CR) fields in the input stream, SD 26 provides the value to timer 30. Timer 30 may use this data to set the current system time when decoder 20 of FIG. 1 is attempting to gain initial synchronization. When the system (decoder 20) is already synchronized, SD 26 can capture the current time from the timer 30 when SD 26 detects CR fields and store the CR fields in registers for presentation to CPU 54.

SD 26 extracts system time stamps, either PCR for transport streams or SCR for program streams, and puts these extracted time stamps in host-accessible registers along with the current system time and the level of each buffer in the received packet. Using the time stamp and buffer level versus system time data as phase measurements into a software-controlled phase-locked loop, CPU 54 can adjust the frequency of the video pixel clock and the audio oversampling clock so that the system time base matches the source material time base on average. The adjustment will lower the rate of skip/repeat events in the presentation processes. When splices occur in a transport stream, there may be a discontinuity between time stamps on either side of the splice.

For transport streams, SD 26 separates a particular program from the remaining programs in the stream. Generally, a program will consist of at most one video elementary stream, at most one audio elementary stream, possibly a teletext stream or a sub-picture stream, and a number of streams containing system information tables. A stream as defined by a service provider may have more than one elementary video or audio stream, but decoder 20 of FIG. 1 only decodes one of each type of stream at a given time.

SD 26 accepts PES packets, SI or PSI tables, or program stream system headers from NP 22. SD 26 places depacketized data into one of a number of circular buffer tags supplying pointers to units within a buffer. For example, for video data, SD 26 provides pointers to picture start codes. For audio data, there are pointers to packets with time stamps present in the stream. For program streams, there generally will be a single default PID used for routing purposes.

Accordingly, SD 26 of FIG. 6 selectively transports demultiplexed and depacketized byte streams. For example, if decoder 20 only includes one audio decoder 34 as shown in FIG. 1, then SD 26 only transports audio data for the user programmed language for audio output (e.g., English or Japanese assuming that the audio decoder can only decode audio data for one language at a time).

FIG. 7 shows an event tag format in accordance with one embodiment of the present invention. SD 26 generates tags that are stored in buffer 48 of FIG. 1. In another embodiment, SD 26 generates an interrupt after it writes a new tag to MMU 60 of FIG. 6. In particular, the tags contain addresses in the system memory (e.g., in a RAM, DRAM, or SRAM that includes buffer 48 of FIG. 1) where data associated with certain events in the input stream can be found. Thus, FIG. 7 provides a table for an event tag that lists the event tag bit definitions in accordance with one embodiment of the present invention.

Figure 8:
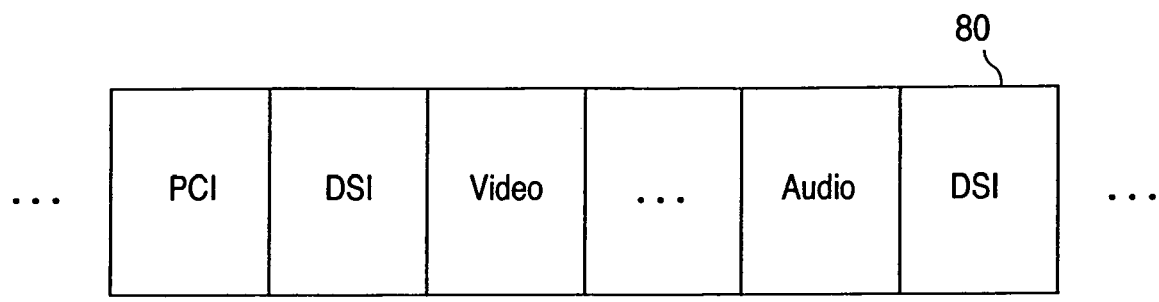
FIG. 8 shows a DVD-oriented layered-packetized protocol that is transported by the stream demultiplexer of FIG. 1 in accordance with one embodiment of the present invention.

FIG. 8 shows a layered-packetized protocol that is demultiplexed, depacketized, and transported by SD 26 of FIG. 1 in accordance with one embodiment of the present invention. In particular, a byte stream 80 represents a layered-packetized protocol that includes PCI packets, DCI packets, video packets, audio packets, and DSI packets. For example, MPEG represents a layered-packetized protocol. In one embodiment, SD 26 of FIG. 1 can handle the transport layer, the PES layer, and the table layer of a layered-packetized protocol such as MPEG2, and CPU 54 can handle parsed elementary stream layers and audio/video streams. A layered-packetized protocol typically includes header information and payload information in the packets of data, and the header information contains various information respecting the packet or perhaps subsequent or preceding packets of similar or different packet types. In particular, SD 26 can use the header information to selectively demultiplex packets of byte stream 80, as discussed above with respect to FIGS. 1 and 2A–2C.

Figure 9:
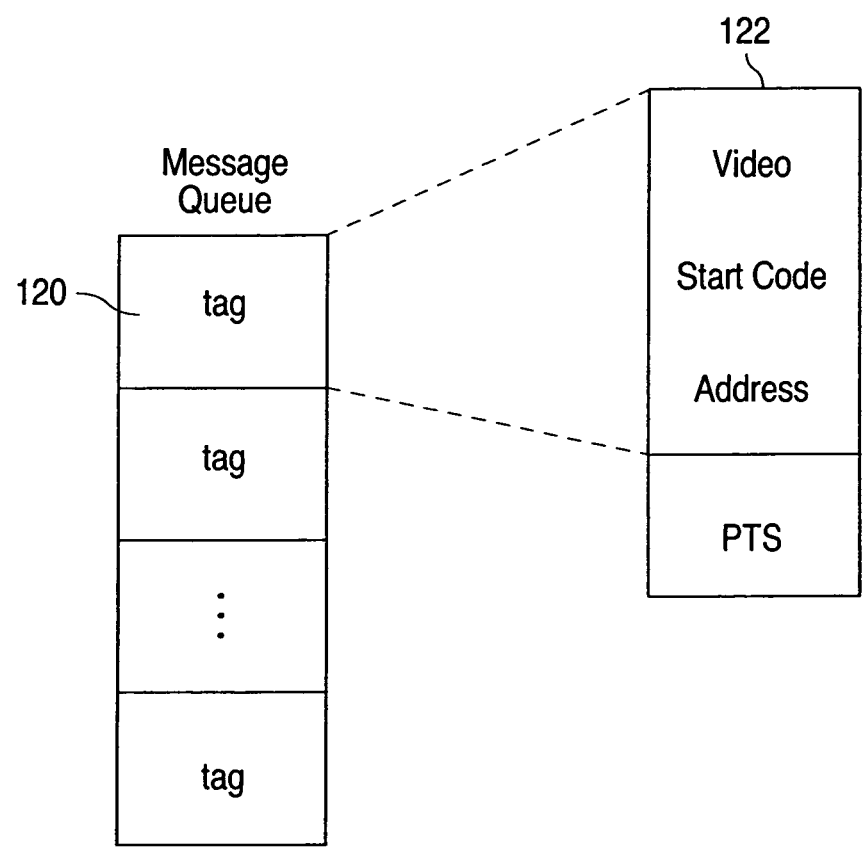
FIG. 9 shows a message queue in accordance with one embodiment of the present invention.

FIG. 9 provides a message queue 120 in accordance with one embodiment of the present invention. Message queue 120 includes tags consisting of the above-mentioned audio and video messages generated by SD 26 for use by CPU 54. Message queue 120 is a FIFO queue stored in a sub-buffer of buffer 48 of FIG. 1. In particular, when SD 26, as discussed above with respect to FIGS. 1 and 2A–2C, identifies significant information such as the location of the start of a new video frame or a presentation time stamp of a particular video frame, then SD 26 generates a tag (video message) such as a tag 122 and stores tag 122 in message queue 120. In one embodiment, SD 26 generates a message that audio or video data is stored in buffer 48 of FIG. 1 and ready for decoding even prior to storing all the audio or video data, respectively, in buffer 48. CPU 54 periodically accesses message queue 120 (e.g., every Vsync) and reads the tags in real time.

In particular, message queue 120 provides a FIFO queue such that the most recent event is stored in the tag that is at the top of the FIFO queue. For example, referring to FIG. 8, if video data is identified prior to audio data in byte stream 80, then a tag (video message) in message queue 120 identifying a time stamp for the video data of byte stream 80 would be lower in message queue 120 than a tag (audio message) identifying a time stamp for the audio data (e.g., such tags may also include an address identifying the location of the audio and video data, respectively, in buffer 48 of FIG. 1).

Accordingly, SD 26 performs time/space multiplexing that allows CPU 54 to function in a batch mode rather than generating interrupts to CPU 54 each time a significant piece of information is identified by SD 26. For example, message queue 120 as used by SD 26 represents an alternative approach to having SD 26 generate interrupts to CPU 54 each time SD 26 identifies significant information (the interrupt approach). The interrupt approach is inefficient, because every time an interrupt is generated for CPU 54, CPU 54 spends a few cycles processing the interrupt. Thus, SD 26 advantageously uses message queue 120 to implement a hardware-based messaging system (hardware-based tagging mechanism).

Moreover, because CPU 54 is processing information one Vsync signal cycle ahead, CPU 54 typically can access the tags in message queue 120 and process the tags appropriately to program audio decoder 34 of FIG. 1 or video decoder 36 of FIG. 1 appropriately in real time. For example, the MPEG protocol assumes that there is at least one frame worth of delay such that the presentation time stamps allow for such delay upon receipt of the video data and the audio data. Accordingly, decoder 20 uses SD 26 and message queue 120 to take advantage of this scheme by providing a hardware-based messaging system for decoder 20 of FIG. 1. In one embodiment, CPU 54 uses MMU 60 of FIG. 6 to request all the messages stored in message queue 120, and CPU 54 performs this task periodically (e.g., every Vsync) such that the tags are processed well in advance as necessary for appropriate display timing. Alternatively, SD 26 may in all or some cases also raise an interrupt to CPU 54 when generating a tag for message queue 120.

Accordingly, SD 26 of FIG. 1 demultiplexes, depacketizes, and transports byte streams and provides a hardware-based tagging mechanism in accordance with one embodiment of the present invention. CPU 54 reads the tags and, based on the tags, programs decoder 20 of FIG. 1 such that the audio data and video data are output within the presentation time requirements.

Although particular embodiments of the present invention have been shown and described, changes and modifications may be made without departing from the present invention in its broader aspects. The appended claims are therefore to encompass within their scope all such changes and modifications that fall within the true scope of the present invention.

The invention claimed is:

1. A decoder system comprising:
    a control unit capable of performing multiple tasks and capable of being interrupted during at least one of the tasks to perform at least one other of the tasks;
    a first data buffer comprising a video input buffer and an audio input buffer;
    a stream demultiplexer for receiving an incoming data stream comprising data packets each comprising at least one of (i) encoded video data and a video header that contains video timing information for the encoded video data and (ii) encoded audio data and an audio header that contains audio timing information for the encoded audio data, the stream demultiplexer operating
    (a) to demultiplex and depacketize the data packets without interrupting the control unit,
    (b) to send the encoded video data to the video input buffer for storage there without the video timing information,
    (c) to provide, for use by the control unit, video messages which identify where the encoded video data is stored in the video input buffer and which also deal with the video timing information, and (d) to send the encoded audio data to the audio input buffer for storage there;

a video decoder that decodes the encoded video data to produce decoded video data utilizing video instructions provided from the control unit as to where the encoded video data is stored in the video input buffer;

an audio decoder that decodes the encoded audio data to produce decoded audio data;

a second data buffer comprising (a) a video output buffer that stores the decoded video data and (b) an audio output buffer that stores the decoded audio data; and a memory management unit responsive to signals from the control unit for controlling transfer of the decoded audio data to and from the audio output buffer.

2. A decoder system as in claim 1 wherein the control unit is interrupted in response to a synchronization signal for reading the video messages provided by the system demultiplexer and for providing the video instructions to the video decoder.

3. A decoder system as in claim 2 wherein the control unit reads each video message provided by the system demultiplexer during the period between consecutive occurrences of the synchronization signal and provides a responsive one of the video instructions to the video decoder during that period.

4. A decoder system as in claim 2 wherein the video decoder decodes the encoded video data in response to the synchronization signal.

5. A decoder system as in claim 4 wherein the video decoder decodes the encoded video data in response to an occurrence of the synchronization signal only when an unserviced one of the video instructions from the control unit is present at the video decoder.

6. A decoder system as in claim 4 wherein the control unit provides each video instruction to the video decoder in response to an occurrence of the synchronization signal for use by the video decoder in response to the next occurrence of the synchronization signal.

7. A decoder system as in claim 2 wherein the synchronization signal is provided at a substantially fixed frequency.

8. A decoder system as in claim 1 wherein the video messages comprise tags which contain the timing information and the addresses of storage locations for the encoded video data in the video input buffer.

9. A decoder system as in claim 8 wherein the video instructions comprise task definition packets which contain the addresses of storage locations for the encoded video data in the video input buffer.

10. A decoder system as in claim 1 wherein the video timing information comprises at least one of a presentation time stamp and a decoder time stamp.

11. A decoder system as in claim 1 wherein the encoded audio data is stored in the audio input buffer without the audio timing information, the stream demultiplexer also operating to provide, for use by the control unit, audio messages which deal with the audio timing information.

12. A decoder system as in claim 11 wherein the audio messages also indicate where the encoded audio data is stored in the audio input buffer.

13. A decoder system as in claim 11 wherein the audio decoder detects audio sync words in the encoded audio data.

14. A decoder system as in claim 13 wherein the control unit utilizes the audio timing information and the audio sync words provided from the audio decoder to detect presentation times for the decoded audio data.

15. A decoder system as in claim 11 wherein the timing informations comprise time stamps.

16. A decoder system as in claim 1 further including:
a timer for maintaining local current time; and
a clock generator coupled to the timer for providing clock references for the decoder system.

17. A decoder system as in claim 1 wherein the first data buffer includes a message queue for storing the video messages provided by the stream demultiplexer for use by the control unit.

18. A decoder system as in claim 1 further including:
a video output processor for processing the decoded video data to produce processed video data suitable for video presentation; and
an audio output processor for processing the decoded audio data to produce processed audio data suitable for digital-to-analog conversion.

19. A decoder system as in claim 18 wherein, in response to a synchronization signal generated by the video output processor, the control unit is interrupted for reading the video messages provided by the stream demultiplexer and for providing the video instructions to the video decoder.

20. A decoder system as in claim 19 wherein the video decoder decodes the encoded video data in response to the synchronization signal.

21. A decoder system as in claim 1 for use in an audio/video system that includes:
a video display for displaying the processed video data in picture form; and
an audio digital-to-analog converter for converting the processed audio data into analog audio data.

22. A decoder system as in claim 1 wherein the data packets are constituted in data bytes.

23. A decoder system as in claim 22 wherein the data bytes comprise Digital Versatile Disc bytes or Digital Video Broadcast bytes.

24. A decoder system as in claim 22 further including a Digital Versatile Disc-Digital Signal Processor interface that converts a Digital Versatile Disc bit stream into a byte stream supplied to the stream demultiplexer as its incoming data stream.

25. A decoder system as in claim 22 further including a Network Port that converts a Digital Video Broadcast bit stream into a byte stream supplied to the stream demultiplexer as its incoming data stream.

26. A decoder system as in claim 1 wherein the memory management unit also controls (a) transfer of the encoded video data to and from the video input buffer in response to signals from the control unit and (b) transfer of the encoded audio data to and from the audio input buffer in response to signals from the control unit.

27. A decoder system as in claim 26 wherein the first data buffer is external to an integrated circuit containing the control unit.

28. A method comprising:
receiving an incoming data stream comprising data packets each comprising at least one of (i) encoded video data and a video header that contains video timing information for the encoded video data and (ii) encoded audio data and an audio header that contains audio timing information for the encoded audio data;
demultiplexing and depacketizing the data packs without interrupting a control unit capable of performing multiple tasks and capable of being interrupted during at least one of the tasks to perform at least one other of the tasks;
storing the encoded video data in a video input buffer without the video timing information;

providing, for use by the control unit, video messages which identify where the encoded video data is stored in the video input buffer and which also deal with the video timing information;

decoding the encoded video data to produce decoded video data using video instructions provided from the control unit as to where the encoded video data is stored in the video input buffer;

storing the encoded audio data in an audio input buffer;

decoding the encoded audio data to produce decoded audio data; and utilizing a memory management unit responsive to signals from the control unit to control transfer of the decoded audio data to and from an audio output buffer.

29. A method as in claim 28 further including:
generating a synchronization signal; and
interrupting the control unit in response to the synchronization signal for causing the control unit to read the video messages and to generate the video instructions.

30. A method as in claim 29 wherein the control unit reads each video message during the period between consecutive occurrences of the synchronization signal and generates a responsive one of the video instructions during that period.

31. A method as in claim 29 wherein the decoding of the encoded video data occurs in response to the synchronization signal.

32. A method as in claim 31 wherein the decoding of the encoded video data occurs in response to an occurrence of the synchronization signal only when an unserviced one of the video instructions is in existence.

33. A method as in claim 31 wherein the control unit generates each of the video instructions in response to an occurrence of the synchronization signal for use in decoding the encoded video data at the next occurrence of the synchronization signal.

34. A method as in claim 29 wherein the synchronization signal is provided at substantially a fixed frequency.

35. A method as in claim 28 wherein the encoded audio data is stored in the audio input buffer without the audio timing information, the method further including providing, for use by the control unit, audio messages dealing with the timing information.

36. A method as in claim 35 wherein the audio messages also indicate where the encoded audio data is stored in the audio input buffer.

37. A method as in claim 28 further including detecting sync words in the encoded audio data.

38. A method as in claim 37 further including utilizing the audio timing information and the sync words to determine presentation times for the decoded audio data.

39. A method as in claim 28 further including:
processing the decoded video data to produce processed video data suitable for video presentation; and
processing the decoded audio data to produce processed audio data suitable for digital-to-analog conversion.

40. A method as in claim 39 further including:
utilizing a video output processor that processes the decoded video data to generate a synchronization signal; and
interrupting the control unit in response to the synchronization signal for reading the video messages and for generating the video instructions.

41. A method as in claim 40 wherein the decoding of the encoded video data occurs in response to the synchronization signal.

42. A method as in claim 39 further including:
displaying the processed video data in picture form; and
converting the processed audio data into analog audio data.

43. A method as in claim 28 further including converting an incoming bit stream into a byte stream that constitutes the incoming data stream.

44. A method as in claim 28 further including utilizing the memory management unit (a) to control transfer of the encoded video data to and from the video input buffer in response to signals from the control unit and (b) to control transfer of the encoded audio data to and from the audio input buffer in response to signals from the control unit.

45. A method as in claim 44 further including accessing the video and audio input buffers external to an integrated circuit containing the control unit.

* * * * *